INVENTOR.
Erik Herbert Olofsson
BY
By Cushman, Darby & Cushman
Attorneys

Aug. 23, 1966 E. H. OLOFSSON 3,268,787

FINAL STAGE OF A SERVO AMPLIFIER

Filed Sept. 26, 1963 2 Sheets-Sheet 2

Inventor
Erik Herbert Olofsson
By Cushman, Darby & Cushman
Attorneys

United States Patent Office 3,268,787
Patented August 23, 1966

3,268,787

FINAL STAGE OF A SERVO AMPLIFIER

Erik Herbert Olofsson, Johanneshov, Sweden, assignor to Regulator A.G., Glarus, Switzerland, a company of Switzerland Filed Sept. 26, 1963, Ser. No. 311,708
Claims priority, application Sweden, Sept. 28, 1962, 10,502/62
5 Claims. (Cl. 318—207)

The present invention relates to an improved design of a final stage of a servo amplifier comprising no relays.

Known amplifiers of said kind are impaired by drawbacks, e.g. on account thereof that they require a certain undesirable wiring or a steady connection of a motor winding with a resulting undesirable heating of the motor, and often great number of components which make the device unnecessarily expensive.

The object of the amplifier according to the invention is to achieve a saving in respect of the number of expensive components and to eliminate the above mentioned drawbacks. According to the invention the final stage comprises an input transformer and a supply transformer, the input transformer having at least two separate secondary windings connected to input electrodes of two controlled semiconductive devices in such a manner as to feed said devices in opposition, and the invention is essentially characterized by two main groups of rectifying members parallelly connected between one output electrode of either of said controlled semiconductive devices and each comprising four members in series, each main group being divided into two subgroups consisting each of two rectifying members of the same direction of conductivity, and the subgroups of each main group having mutually opposite directions of conductivity, and wherein the points of mutual connection of the subgroups of each main group are connected to another output electrode of either of said controlled semiconductive devices, and the points of mutual connection of the members of one subgroup of each main group are connected to a separate bipolar load member, said load members in common also being connected via the secondary winding of the supply transformer to the points of mutual connection of the members of the other subgroup of each main group.

Figure 1:
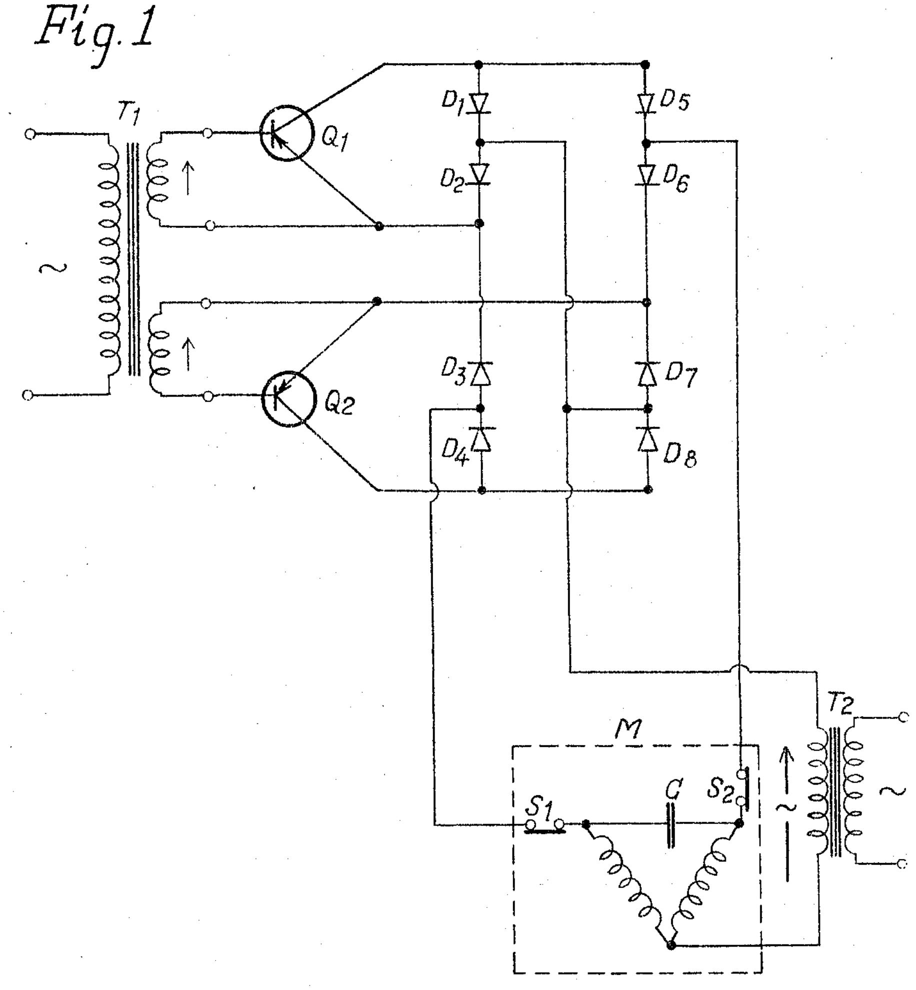
Figure 2:
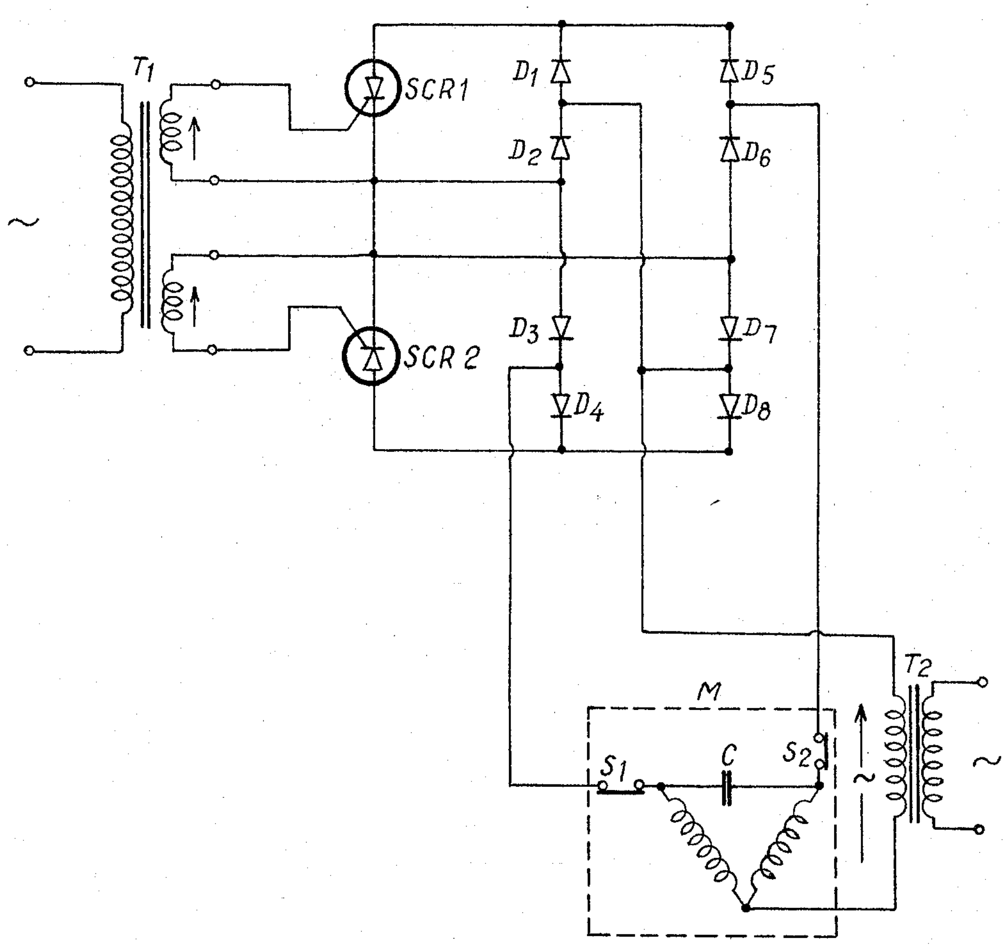

The invention will now be described more closely with reference to the accompanying drawings, in which FIGS. 1 and 2 are wiring diagrams of a first and a second embodiment, respectively.

In FIG. 1, $T_1$ designates an input transformer having two separate secondary windings which are connected to the base and emitter electrodes of two transistors $Q_1$ and $Q_2$ in such a manner as to feed them in opposition. Connected in parallel between the collector electrodes of the transistors are two-groups of series-connected rectifiers $D_1$–$D_8$, each group comprising four rectifiers and being divided into two subgroups of two rectifiers each. The members are orientated in the same direction in the subgroups, whereas the subgroups of each main group are orientated in opposition to each other. The emitter electrodes of the transistors are connected separately to the points of mutual connection of the subgroups of rectifiers, whereas the points of mutual connection of the members of one of the subgroups of each main group are connected each to a separate winding upon a two-phase servo motor M. The other terminals of said windings are connected in common to one end of the secondary winding of a supply transformer $T_2$, the primary winding of which is connected to a suitable source of current, preferably the mains. The other end point of the secondary winding is connected to the point of mutual connection of the members of the other subgroup of each main group. A capacitor C is arranged between the free end points of the servo motor winding in order to effect a phase displacement of about 90 degrees between the tensions across the two windings. $S_1$ and $S_2$ designate two switches for limit interruption.

The operation of the device shown in the drawing is briefly the following: Assume that the transformers $T_1$ and $T_2$ are supplied with the mains frequency and that the only possible relative phase positions are in phase and in opposition and that during a half cycle current flows as is shown by the arrows. Then the transistor $Q_1$ will be blocked and the transistor $Q_2$ conductive. The current flows from the secondary winding of the transformer $T_2$ via the diode $D_7$ to the emitter of the transistor $Q_2$, passes through $Q_2$ and flows via the diode $D_4$ and one winding of the servo motor M back to the transformer winding. The other possible current path via the diode $D_2$ to the transistor $Q_1$ is blocked, because the latter is non-conductive.

During the following half cycle, i.e. when all arrows point the other way, the transistor $Q_1$ is conductive whereas the transistor $Q_2$ is blocked. Then the current path goes from the secondary winding of the transformer $T_2$ via the diode $D_1$ through the transistor $Q_1$ and the diode $D_3$ to the same servo motor winding as during the previous half cycle and from there back to the transformer winding. The other possible path via the transistor $Q_2$ is blocked, because said transistor is non-conductive.

If the arrows at the transformer $T_1$ are reversed whereas the arrow at the transformer $T_2$ maintains its direction unchanged, the other winding of the servo motor will be connected to the secondary winding of the transformer $T_2$ during the whole cycle, which involves a reversed direction of rotation as compared to the first-described case.

The embodiment shown in FIG. 2 differs from the one just described essentially therein that the controlled semiconductive devices are not transistors, but controlled three-electrode rectifiers, e.g. silicon controlled rectifiers, SCR1 and SCR2. The secondary windings of the input transformer $T_1$ are connected between the cathode and the gate electrodes of said rectifiers. The anodes are connected to separate terminals of the network of two-electrode rectifiers $D_1$–$D_8$. The cathode of SCR1 (or SCR2) which is common to the input circuit and the output circuit, is connected to the midpoint of one of the main groups of two-electrode rectifiers, the two cathodes being connected to the midpoint of separate main groups.

I claim:

1. A final stage of a servo amplifier comprising an input transformer and a supply transformer, the input transformer having at least two separate secondary windings connected to input electrodes of two controlled semiconductive devices in such a manner as to feed said devices in opposition, two main groups of rectifying members connected in parallel between one output electrode of either of said semiconductive devices and each comprising four members in series, each main group being divided into two subgroups consisting each of two rectifying members of the same direction of conductivity and the subgroups of each main group having mutually opposite directions of conductivity, the points of mutual connection of the subgroups of each main group being connected to another output electrode of a separate one of said controlled semiconductive devices and the points of mutual connection of the members of one subgroup of each main group being connected to a separate bipolar load member, the latter also being connected in common via the secondary winding of the supply transformer to the points of mutual connection of the members of the other subgroup of each main group.

2. An amplifier stage according to claim 1, in which the controlled semiconductive devices are transistors having their base and emitter electrodes connected to the input transformer, their collector electrodes connected to the terminals of the two main groups of series-connected rectifier members and their emitter electrodes connected each to a separate point of mutual connection of the subgroups of rectifying members.

3. An amplifier stage according to claim 1, in which the controlled semiconductive devices are controlled rectifiers.

4. An amplifier stage according to claim 1, in which the load members consist of the windings of a two-phase servo motor, and said windings are connected to said rectifying members via normally closed contacts for limit control of a device driven by the servo motor.

5. A final stage of a servo amplifier, comprising two controllable semiconductive three-electrode devices, each having an input circuit and an output circuit, said input circuits being fed in opposition by a controlling alternating current signal, a network of rectifiers comprising between its terminals two parallelly connected main groups of rectifiers, each main group consisting of two series-connected subgroups of mutually opposed conductivity and each subgroup consisting of two rectifiers in series and conductive in the same direction, the output circuit of each semiconductive device being connected to a separate terminal of said network and to the point of mutual connection of the subgroups of a separate main group of rectifiers, an alternating current source, a reversible electric motor, a first winding on said motor adapted for driving the same in one direction of rotation, a second winding on said motor adapted for driving the same in the opposite direction of rotation, said first winding in series with said source being connected between the midpoints of the subgroups of one main group, and said second winding in series with said source being connected between the midpoints of the subgroups of the other main group.

References Cited by the Examiner

UNITED STATES PATENTS

| | | | |
|---|---|---|---|
| 2,888,622 | 5/1959 | Mooers | 318—257 |
| 2,999,198 | 9/1961 | Schlick | 318—207 |
| 3,109,971 | 11/1963 | Welch | 318—207 X |
| 3,168,691 | 2/1965 | Olofsson | 318—207 |

ORIS L. RADER, *Primary Examiner.*

G. FRIEDBERG, *Assistant Examiner.*